(12) United States Patent
Sugata et al.

(10) Patent No.: US 6,896,453 B1
(45) Date of Patent: May 24, 2005

(54) CUTTING TOOL DEVICE FOR MACHINE TOOL

(75) Inventors: Shinsuke Sugata, Fukuyama (JP); Kazutaka Yoshimura, Fukuyama (JP)

(73) Assignee: Horkos Corp., Fukuyama (JP)

( * ) Notice: Subject to any disclaimer, the term of this patent is extended or adjusted under 35 U.S.C. 154(b) by 0 days.

(21) Appl. No.: 10/111,607

(22) PCT Filed: Nov. 24, 1999

(86) PCT No.: PCT/JP99/06553

§ 371 (c)(1),
(2), (4) Date: Apr. 26, 2002

(87) PCT Pub. No.: WO01/32357

PCT Pub. Date: May 10, 2001

(30) Foreign Application Priority Data

Nov. 2, 1999 (JP) .................................. 11/312647

(51) Int. Cl.[7] .......................... B23C 9/00; B23Q 11/00
(52) U.S. Cl. ........................................ 409/137; 408/67
(58) Field of Search ............................. 409/137, 136; 408/67

(56) References Cited

U.S. PATENT DOCUMENTS

| | | | | | |
|---|---|---|---|---|---|
| 3,828,649 | A | * | 8/1974 | Lecailtel et al. | ............. 409/137 |
| 4,981,403 | A | * | 1/1991 | Katayama | ................... 409/136 |
| 5,791,842 | A | * | 8/1998 | Sugata | ....................... 409/137 |
| 5,893,687 | A | * | 4/1999 | Oketani et al. | ............... 408/97 |
| 5,947,661 | A | * | 9/1999 | Sugata | ........................ 409/131 |
| 5,984,598 | A | * | 11/1999 | Arai et al. | ................... 409/137 |
| 6,264,590 | B1 | * | 7/2001 | Ferrari | ........................ 483/13 |
| 6,394,940 | B1 | * | 5/2002 | Sugata et al. | .................. 483/13 |

FOREIGN PATENT DOCUMENTS

| JP | 6-143087 | 5/1994 |
|---|---|---|
| JP | 9-285938 | 11/1997 |

OTHER PUBLICATIONS

Microfilm of the specification and drawings annexed to the request of Japanese Utility Model Application No. 109782/1987 (Laid-open No. 16237/1989), (Sekisui Chemical Co., Ltd., Jan. 26, 1989, p. 6, line 13 to p. 7, line 14, Figs. 1-3.

* cited by examiner

Primary Examiner—Erica Cadugan
Assistant Examiner—Dana Ross
(74) Attorney, Agent, or Firm—Merek, Blackmon & Voorhees, LLC

(57) ABSTRACT

A cutting tool device for a machine tool having a cutting tool (2) for cutting a plane fixed to the tip end of a rotating shaft (1) and provided with a suction cover (10) covering airtightly the surrounding portions except for a tip face (a), of the cutting tool (2), wherein a hood (19) is attached to the tip opening edge of the suction cover (10) so as to further extend forward therefrom and to be displaceable longitudinally within a limited range, and an urging means (24) for urging the hood (19) forward is provided, whereby chips (w1) produced by the cutting tool (2) can be positively sucked and discharged when the tool is used in any of a roughing step and a finishing step.

16 Claims, 3 Drawing Sheets

CUTTING TOOL DEVICE FOR MACHINE TOOL

FILED OF THE INVENTION

The present invention relates to a cutting tool device of a machine tool that can rationally remove chips.

BACKGROUND OF THE INVENTION

The Japanese patent No. 2535964, for example, discloses a cutting tool device of a machine tool having a fraise cutter fixed to the tip of a rotating shaft and provided with a suction cover covering the surrounding portions, except for the tip face, of the cutter.

This cutting tool device moves in a direction transverse to the rotating shaft during use. The fraise cutter machines a work surface of a workpiece in a plane during its movement. On the other hand, air inside the suction cover is drawn by an air suction device arranged separately and is eliminated in another place. Because of this elimination, an air flow generated around the fraise cutter acts to continuously discharge to the other place chips produced by machining with the fraise cutter.

In the above machine tool, plural kinds of cutting tool devices, in each of which the longitudinal distance between the tip face of the fraise cutter and the tip face of the suction cover is suitably changed, are usually prepared for various machining steps, such as a roughing step and a finishing step, in relation to an uneven size of the work surface and the amount of material to be cut with each pass of a cutting element. These cutting tool devices are used so that exchanging of the devices may be carried out for each machining step to the end of the cutting work.

The above-described conventional cutting tool device is uneconomical in preparing different cutting tool devices for each machining step of the work. Besides, these devices need to be exchanged during the machining, thereby taking more time, as well as having a disadvantage in keeping cutting accuracy. An object of this invention, therefore, is to propose a cutting tool device for a machine tool that can overcome the above problems.

SUMMARY OF THE INVENTION

To achieve the above objects, the present invention comprises a cutting tool for cutting a plane fixed to the tip of a rotating shaft, and a suction cover covering airtightly surrounding portions, except for the tip face of the cutting tool, wherein a hood is attached to the tip opening edge of the suction cover so as to further extend forward therefrom to be displaceable longitudinally within a limited range, and an urging means for urging the hood forward is provided.

According to this structure, the hood retreats upon touching an uneven work surface of a workpiece without disturbing the cutting step. The tip face of the hood can come very close to the uneven face during not only a finishing step but also a roughing step without having its position adjusted. Because of the effect of this hood, one cutting tool device can be utilized both in a roughing step and a finishing step.

The present invention has structures as follows.

When the hood is located at a forward restricted position in its longitudinal displaceable range, the tip face of the hood is set apart from the cutting edges of the cutting tool by about 0.5 mm–3.0 mm. According to this structure, the cutting tool device can be utilized intact in both a practical roughing process and a practical finishing process.

Besides, the front restricted position of the hood in the longitudinal displaceable range can be changed. According to this structure, the hood can always act in the best condition on a variety of workpieces having different uneven faces and any amount of cut material for each pass of a cutting element.

Moreover, the tip face of the hood is tapered outwardly along its radial direction. According to this structure, when the tip face of the hood contacts the uneven work surface, the hood stops being caught easily and unevenly on the work surface, and can receive greater upward force smoothly, thereby enabling high quality cutting.

Furthermore, the rotating shaft, the cutting tool, the suction cover, the hood and the urging means are formed into an independent integral structure, which is detachable from a main spindle of the machine tool. According to this structure, the cutting tool devices can be easily exchanged with another one, and their removal is carried out by an automatic cutting tool device exchanging machine.

BRIEF DESCRIPTION OF THE DRAWINGS

FIG. 3A shows a state right before a machining process starts; FIG. 3B shows the surrounding portions of the front end side in a main spindle traveling direction of a sleeve during machining.

DESCRIPTION OF PREFERRED EMBODIMENTS

Figure 1:
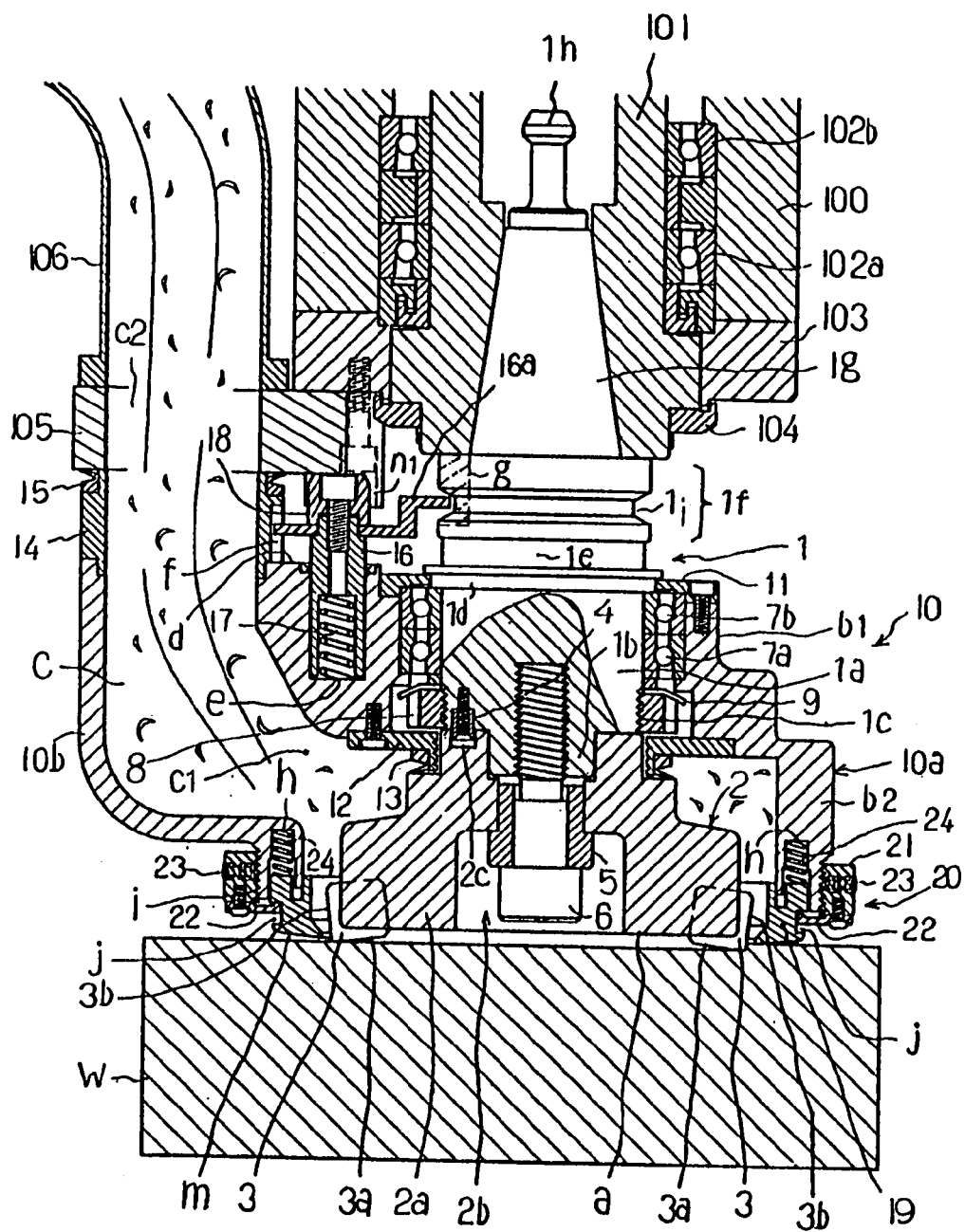
FIG. 1 is a side perspective view showing a part of a cutting tool device of a machine tool according to this invention.

First, the cutting tool device is described in detail. Numeral 1 is an arbor of a rotating shaft. The arbor 1 includes a parallel body 1a, on the front-end face of which is provided a protruding portion 1b having a round section, on the periphery of the front end of which is provided male screw 1c, and on the back end of which is provided the first flange 1d. Besides, the second flange 1f is provided on the back of the first flange 1d through a parallel body 1e, and a taper shank 1g is provided at the back thereof. Moreover, a pulling stud 1h protruding backward is provided on the back-end face of the taper shank 1g. In this case, 1i is a circular groove body having a trapezoid section provided in the longitudinal middle of the second flange 1f, which is gripped by a tool-exchanging machine not shown.

Numeral 2 is a fraise cutter as a cutting tool for cutting a plane, comprising a stepped cylindrical cutter body 2a, on an outer circumference of the tip face a of which are longitudinally fixed at limited intervals in circumferential direction chips 3 that are square in side view, at the center of which is provided a stepped internal hole 2b, and on the back face of which is provided an interfitted indentation 2c to receive a detent key 4 fixed on the tip face of the parallel body 1a of the arbor 1.

Figure 3:
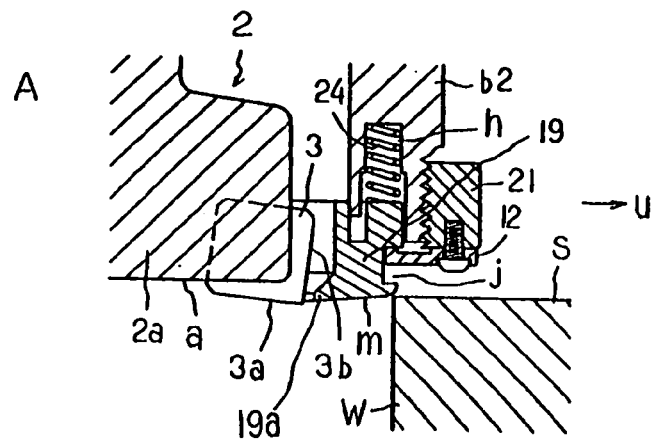
FIGS. 3A–3B are schematic views showing the actions of the above cutting tool device.
FIG. 3C shows the surrounding portions of the back end side in a main spindle traveling direction of the sleeve during machining.
Figure 3:
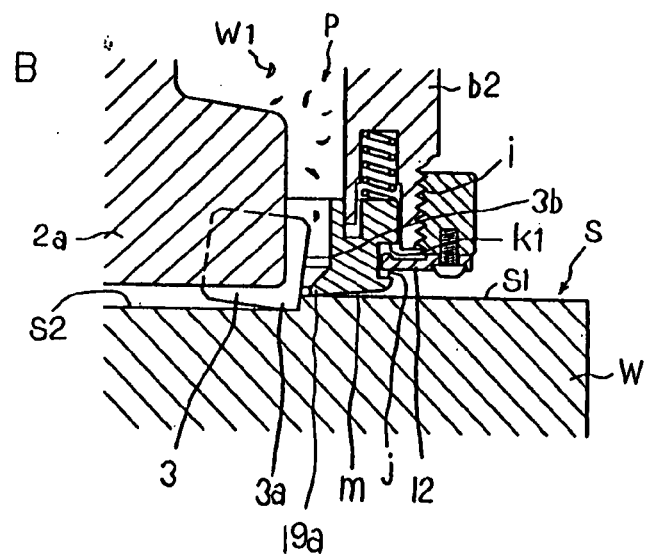
Figure 3:
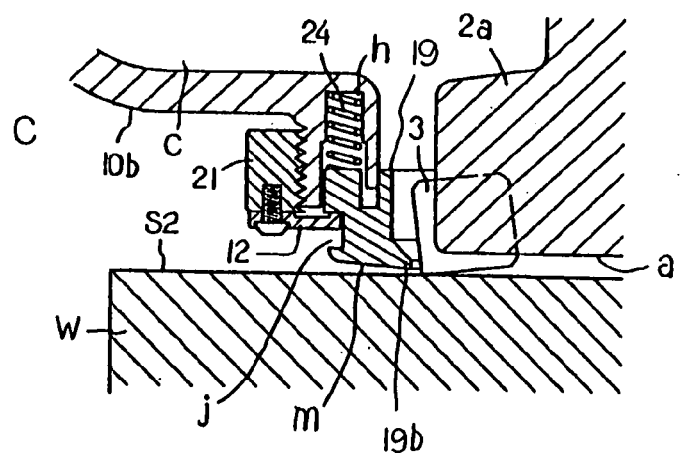

Here, as shown in FIG. 3A, a front cutting edge 3a of the chip 3 serves as a front edge of the cutter body 2a, whereas a side cutting edge 3b thereof serves as a side edge thereof.

The fraise cutter 2 is fixed to the tip of the arbor 1 in the following manner. The aftermost part of the internal hole 2b of the cutter body 2a is externally engaged with the protruding body 1b of the arbor 1, and the detent key 4 fixed on the tip face of the arbor 1 is internally engaged with the interfitting indentation 2c. Besides, a flanged bush 5 is internally engaged with a middle part of the internal hole 2b of the cutter body 2a, and a fixing bolt 6 is inserted into an inner hole of the bush 5. Then, a threaded portion of the bolt 6 is screwed into a female screw formed on the protruding body 1b of the arbor 1.

Numerals 7a, 7b are a pair of front and back ball bearings provided on the outside of the parallel body 1a of the arbor 1. A back-end face of an inner ring for the back ball bearing 7b is engaged with the first flange 1d, whereas a front-end face of an inner ring for the front ball bearing 7a is pressed against a nut 8 screwed to the male screw 1c of the parallel body 1a through a spacer ring and a circular plate 9. Thus, longitudinal positions of the ball bearings 7a, 7b for the arbor 1 are restricted. Besides, the circular plate 9 is to prevent the nut 8 from being loosened.

Numeral 10 is a suction cover, comprising a stepped cylindrical body 10a and a suction passage 10b. The stepped cylindrical body 10a covers the surrounding portions in an airtight manner, except for the tip face 'a' of the fraise cutter 2, and the suction passage 10b extends rearward so as to protrude sideways from a part of the periphery of the cylindrical body 10a.

The cylindrical body 10a includes a base body b1 having an inner hole which is externally engaged with the ball bearings 7a, 7b, and a head body b2 having an inner hole of relatively large diameter for encircling the fraise cutter 2. A back circular securement plate 11 is bolted to the back face of the base body b1 to prevent forward displacement of the suction cover 10 at an outer ring of the back ball bearing 7b by protruding inward of the inner hole of the suction cover. In addition, a front circular securement plate 12 is bolted to a marginal step between the inner hole of the base body b1 and the inner hole of the head body b2 to prevent backward displacement of the suction cover 10 at the front face of the nut 8. Moreover, a sealing means 13 is provided to seal the intermediate between the circular securement plate 12 and the cutter body 21 in an airtight manner.

The above suction passage 10b is provided with a suction pass c which communicates with the inner hole of the head body b2. The suction pass c is led sideways and rearward from a portion c1 communicating with the inner hole of the head body b2 to a protruding face d which extends the back face of the base body b1 sideways. A connector 14 is fixed to the back end of the suction pass c, and then a circular sealing member 15 is fitted to a back edge of the connector 14.

A detent means for the suction cover 10 is provided between the connector 14 and the back circular, secure plate 11 on the protruding face d. The detent means comprises a guiding hole e formed on the protruding face d, a sliding shaft 16 inserted into the guiding hole e, and a compressed spring 17 provided between the sliding shaft 16 and the bottom of the guiding hole e. Besides, an engaging plate 16a and a cap 18 are bolted to the tip of the sliding shaft 16. Moreover, the outer end of the engaging plate 17 is engaged with a vertical groove f formed on the outer periphery of the connector 14, whereas the inner end of the engaging plate 16a is engaged with a vertical groove g formed on the circular groove body 1i of the second flange 1f.

Here, an explanation follows concerning the action of the engaging plate 16a. When the engaging plate 16a is free, the sliding shaft 16 is pushed backward by the compressed spring 17. This backward movement is restricted by an interaction between the outer end of the engaging plate 16a and the back end of the vertical groove f. In this state, the inner end of the engaging plate 16a is located at the upper end of the vertical groove g, thereby restricting rotations of the arbor 1. However, if the sliding shaft 16 is pushed forward for a limited distance by some other means, the inner end of the engaging plate 16a is located in the circular groove body 1g, thereby releasing the arbor 1 to rotate.

Next, an explanation follows concerning the characteristic construction of this invention.

A sleeve 19 as a hood is attached to the tip opening edge of the above suction cover 10 so as to extend further forward therefrom and to be displaceable longitudinally within a limited range. More concretely, a circular guiding groove h is provided on the above-mentioned tip opening edge, and a fitting part of the back of the sleeve 19 is inserted into the guiding groove h so as to be slidingly displaceable longitudinally. Besides, a variable device 20 is provided so as to restrict sliding displacement of the sleeve 19 within a limited range and to displace the range longitudinally.

The variable device 20 comprises a nut 21 engaged with a male screw i formed on the outer periphery of the tip opening edge of the suction cover 10, and engaging pieces 22 bolted on the front-end face of the nut 21 at fixed intervals in its circumferential direction. The tip of each engaging piece 22 is engaged with a circular groove j of a limited width provided on the outer periphery of the sleeve 19. In this case, fixing screws 23 are provided through the thickness of the nut 21 at fixed intervals in its circumferential direction to fix the nut 21 at a suitable position on the male screw i.

Besides, an urging means is provided so as to urge the sleeve 19 forward. Concretely, compressed springs 24 are provided between the back-end face of the sleeve 19 in the guiding groove h and the bottom face thereof at fixed intervals in a circumferential direction of the guiding groove h. These compressed springs 24 act so that the sleeve 29 is displaced forward with their spring effect. When the sleeve 19 is free, they act so as to keep the sleeve 19 at the front restricted position in its moving range by pushing a back wall k1 (in FIG. 3) of the circular groove j against the engaging pieces 22 on the nut 21, which is fixed at a suitable position on the male screw i.

Moreover, a tip face m of the sleeve 19 is tapered outwardly in a radial direction thereof. When the sleeve 19 is located at the front restricted position, the tip face m of the sleeve 19 is set apart from the cutting edges 3a of the chips 3 by about 0.5 mm–3.0 mm.

The cutting tool device has the above-described construction. The components are connected with each other to form an integral structure.

Next, a main spindle for installing on the above cutting tool device will be explained with reference to FIG. 1 as follows. Numeral 100 is a main spindle supporting member, 101 is a main spindle rotatably supported by the main spindle supporting member 100 through ball bearings 102a, 102b, and 103 is a front circular member bolted to a tip face of the main spindle supporting member 100. Numeral 104 is a circular-covering member of small diameter externally fixed to the tip of the main spindle 101 to cover a space between the main spindle 101 and the front circular member 103. Numeral 105 is a protruding supporting member bolted to a front face of the front circular member 103 so as to keep away from the circular-covering member 104.

Figure 2:
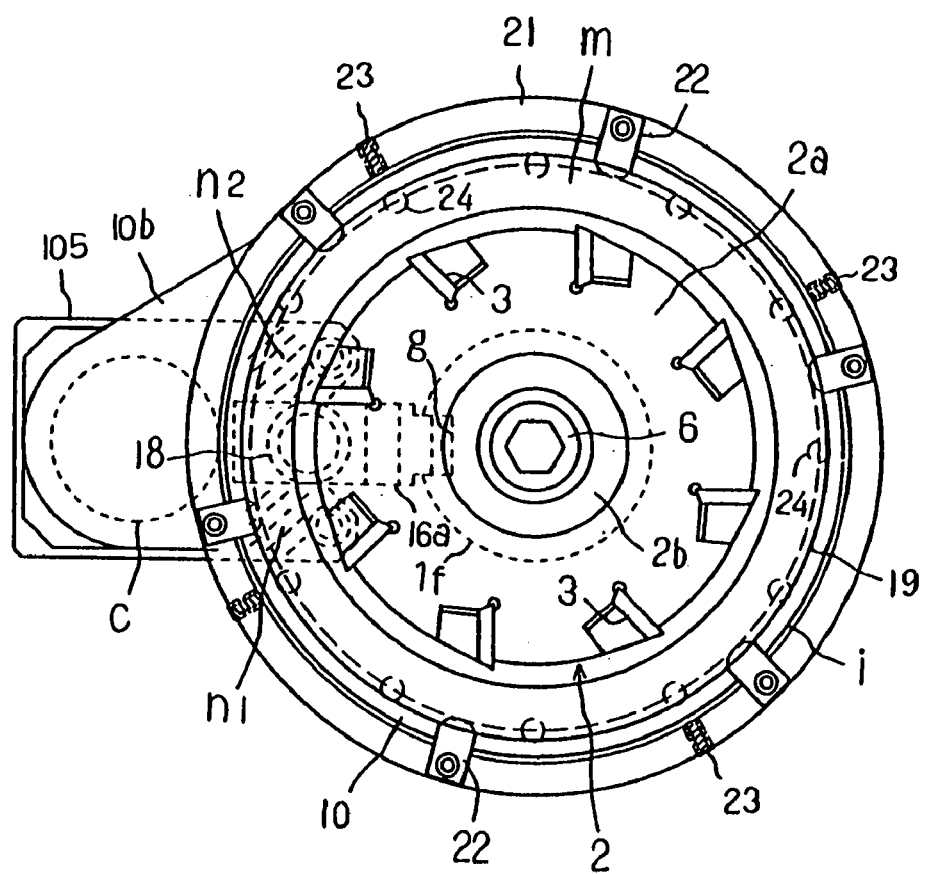
FIG. 2 is a partially front view of a cutting tool in the above-mentioned.

As shown in FIG. 2, a pair of forward protruding bodies n1, n2 are provided on the forward main spindle 101 side of the protruding supporting member 105. The protruding bodies n1, n2 are located at places shown in oblique lines, having the cap 18 therebetween. A suction opening c2 is provided outside the protruding bodies n1, n2, in correspondence with the connector 14. To the back end of the suction opening c2 is connected one end of an air suction pipe 106. Besides, the other end of the air suction pipe 106 is connected to a not-illustrated air suction device.

Next, an explanation follows concerning use and actions of the above cutting tool device.

The above cutting tool device is placed on a storage stand, for example, in a fixed posture, when it is not used. On installing the cutting tool device on the machine tool, the cutting tool device is carried before the main spindle 101 by a not-illustrated tool exchanger, and then the taper shank 1g is pushed into a center hole of the main spindle 101, a shown in FIG. 1.

Next, the pull stud 1h is pulled backward by a not-illustrated drawing mechanism. In consequence, the arbor 1 is fixed to the main spindle 101 firmly, and the cutting tool device is perfectly fixed in a working position. In this state, an inner hole of the connector 105 is connected with the suction opening c2 of the protruding supporting member 105 in an airtight manner through the circular-sealing member 15. The cap 18 for preventing rotations of the suction cover 10 is interfitted between a pair of the protruding bodies n1 and n2, and pushed forward for a limited distance against the compressed spring 17. In consequence, the suction cover 10 is fixed, being restricted from its rotation around the main spindle 101. The inner end of the engaging plate 16a is located in the circular groove body 1i, thereby releasing the arbor 1 to rotate around the center of the main spindle 101.

To detach the cutting tool device from the working position and return it to the storage stand, reverse actions are carried out.

Cutting a workpiece w with the cutting tool device fixed in a state shown in FIG. 1 is carried out in the following manner, for example. The workpiece w is fixed on a not-illustrated working table, and the not-illustrated air suction device is operated. Then, the main spindle is rotated.

Next, as shown in FIG. 3A, the main spindle 101 is moved forward to a suitable position so that the fraise cutter 2 can cut the work at a fixed height. Then, the main spindle 101 is rectilinearly displaced in a direction u perpendicular thereto. As shown in FIG. 3B, the fraise cutter 2 cuts the workpiece w flatly with the front cutting edge 3a and the side cutting edge 3b thereof, while it is moving on. During this process, chips w1 are continuously produced.

On the other hand, the air pass c and chip discharging space p between the fraise cutter 2 and the suction cover 10 are made into a vacuum. Accordingly, air bursts into the chip discharging space p through an opening between the tip face m of the sleeve 19 and a work surface s of the workpiece w. This inflow of the air continuously discharges the chips w1 produced by the fraise cutter 2 into some other place through the chip discharging space p, the air suction pass c, and the air suction pipe 106.

The longitudinal movement of the sleeve 19 is restricted by an annular groove j thereof. Since its front restricted position is relatively low relative to irregularities of the work surface s in the roughing step, a part 19a of the tip face m of the sleeve 19 is in contact with convexities of uncut surface s1. Here, the part 19 is in front of the main spindle moving in its progressive direction. The uncut surface s1 gives a boosting force to the tip face m of the sleeve 19, and therefore the part 19a of the sleeve 19 is pushed back against the compressed spring 24. On the other hand, as shown in FIG. 3C, a part 19b of the sleeve 19 remains in the front restricted position without contacting with a cut surface s2 after the main spindle moving in its progressive direction. The sleeve 19 moves in the direction u perpendicular to the main spindle, being in an inclined and retreated state. Accordingly, the sleeve 19 can move with the spindle 101 and the suction cover 10 without being caught by the work surface s of the workpiece while keeping the distance with it between the sleeve and the work surface small. When the distance between the tip face m of the sleeve 19 and the work surface s is small, inflow speed of the air into the suction cover 10 and discharge capacity of the chip w1 are increased. Besides, since the tip face m of the sleeve 19 is tapered outwardly in a radius direction thereof, the sleeve 19 can move smoothly while in keeping touch with the convexities. Accordingly, interference between the sleeve and the workpiece is avoided more certainly.

During a finishing process, since the irregularity of the work surface s and an amount of material removed during each pass of a cutting element are small, the sleeve 19 can move forward with the spindle 101 and the suction cover 10, generally without contacting with the work surface s. However, as described above, since the restricted position of the sleeve 19 by the annular groove j is relatively low relative the work surface s, the sleeve 19 can keep the distance with the work surface s small during this process. If there is an unexpectedly large burr on the work surface s, the sleeve 19 is inclined and retreated according to the roughing process. Accordingly, the distance between the sleeve 19 and the work surface of the work w is maintained as small as possible, thereby increasing inflow speed of the air into the suction cover 10 as well as discharge capacity of the chips.

It may be necessary to change the front restricted position of the sleeve 19 by the annular groove j according to degree of the uneven work surface s of the work w or an amount of cuts per 1-time cutting of the fraise cutter 2. In this case, the fixing screw 23 is operated to change a longitudinal position of the nut 21 on the male screw i.

In the above embodiment, a sectional form of the passage of the hood 19 is not restricted to a complete round, but it can be a suitable form. Besides, a plate spring or a folded linear spring, or even a fluid pressure utilizing means can be used as an urging means instead of the spring 24. Moreover, a milling cutter or an end mill cutter can be used as a cutting tool for cutting a plane instead of the fraise cutter 2.

According to thus constructed invention, the chips can be effectively discharged during both the roughing step and the finishing step. Therefore, it is unnecessary to prepare different mechanisms for each machining step, which is very economical. Besides, since it is unnecessary to change the cutting tools when moving into the next machining step, time for treatment is shortened and working efficiency increases remarkably. Moreover, it can be prevented to decrease accuracy due to exchanging the cutting edges. Furthermore, since the hood is contacted between the uncut surface and the cut surface of the work in an inclined state, a space between the tip face of the hood and the work surface of the work becomes small. Accordingly, recovery percentage of the chips during a roughing step, for example, can be increased up to 95%.

The present invention can be conveniently utilized in most usual roughing and finishing processes.

The present invention can have suitable suction capacity of the chips for any workpiece having a different uneven work surface or for a broad machining operation requiring different amounts of cut material for each pass of a cutting chip 3.

The tip face of the hood receives great upward force smoothly by touching the uneven work surface of the workpiece, thereby ensuring the hood's retreat as well as its prevention from being caught by the uneven work surface. Besides, when the hood moves along the workpiece, vibrations hardly arise due to their contact, thereby effecting a cut of high quality.

Other cutting tool devices can be applied to the present invention. Besides, the present invention can contribute to forming a structure detachable by an automatic tool-exchanging device.

What is claimed is:

1. A cutting tool device for a machine tool comprising:
   a cutting tool adapted to produce a plane surface by movement parallel to the plane surface being produced, said cutting tool being fixed to a tip end of a rotating shaft and having cutting edges; and
   a suction cover covering and surrounding the cutting tool in an airtight manner, except for a tip face of the cutting tool, wherein a hood is attached to a forward end of the suction cover, around an opening of the suction cover, so as to extend farther forward from the suction cover to be displaceable within a limited range in a direction parallel to the direction in which the hood extends farther forward from the suction cover,
   wherein the hood has a tip face set apart from the cutting edges of the cutting tool by about 0.5 mm–3.0 mm when the hood is located at a forwardmost position in its limited range; and
   means for urging the hood forward, said urging means comprising springs positioned at fixed intervals from one another around the circumference of the opening of the suction cover.

2. A cutting tool device for machine tool as set forth in claim 1:
   wherein the forwardmost position of the hood is adjustable.

3. A cutting tool device for machine tool as set forth in claim 2:
   wherein the hood has a tip face tapered outwardly in its radial direction.

4. A cutting tool device for machine tool as set forth in claim 2:
   wherein the rotating shaft, the cutting tool, the suction cover, the hood, and the urging means are integrated into one independent structural object; and
   wherein said structural object is detachable from a main spindle of the machine tool.

5. A cutting tool device for machine tool as set forth in claim 1:
   wherein the hood has a tip face tapered outwardly in its radial direction.

6. A cutting tool device for machine tool as set forth in claim 5:
   wherein the rotating shaft, the cutting tool, the suction cover, the hood, and the urging means are integrated into one independent structural object; and
   wherein said structural object is detachable from a main spindle of the machine tool.

7. A cutting tool device for machine tool as set forth in claim 1:
   wherein the rotating shaft, the cutting tool, the suction cover, the hood, and the urging means are integrated into one independent structural object; and
   wherein said structural object is detachable from a main spindle of the machine tool.

8. A cutting tool device for machine tool as set forth in claim 1, wherein a guiding groove is defined in the suction cover, around the opening of the suction cover, and said springs are positioned in said guiding groove.

9. A cutting tool device for a machine tool comprising:
   cutting means for producing a plane surface by movement parallel to the plane surface being produced, said cutting means being fixed to a tip end of a rotating shaft and comprising cutting edges;
   a suction cover covering and surrounding the cutting means in an airtight manner, except for a tip face of the cutting means, wherein a hood is attached to a forward end of the suction cover, around an opening of the suction cover, so as to extend farther forward from the suction cover to be displaceable within a limited range in a direction parallel to the direction in which the hood extends farther forward from the suction cover,
   wherein the hood has a tip face set apart from the cutting edges of the cutting means by about 0.5 mm–3.0 mm when the hood is located at a forwardmost position in its limited range; and
   means for urging the hood forward, said urging means comprising springs positioned at fixed intervals from one another around the circumference of the opening of the suction cover.

10. A cutting tool device for machine tool as set forth in claim 9:
    wherein the forwardmost position of the hood is adjustable.

11. A cutting tool device for machine tool as set forth in claim 10:
    wherein the hood has a tip face tapered outwardly in its radial direction.

12. A cutting tool device for machine tool as set forth in claim 10:
    wherein the rotating shaft, the cutting mean, the suction cover, the hood, and the urging means are integrated into one independent structural object; and
    wherein said structural object is detachable from a main spindle of the machine tool.

13. A cutting tool device for machine tool as set forth in claim 9:
    wherein the hood has a tip face tapered outwardly in its radial direction.

14. A cutting tool device for machine tool as set forth in claim 13:
    wherein the rotating shaft, the cutting means, the suction cover, the hood, and the urging means are integrated into one independent structural object; and
    wherein said structural object is detachable from a main spindle of the machine tool.

15. A cutting tool device for machine tool as set forth in claim 9:
    wherein the rotating shaft, the cutting means, the suction cover, the hood, and the urging means are integrated into one independent structural object; and
    wherein said structural object is detachable from a main spindle of the machine tool.

16. A cutting tool device for machine tool as set forth in claim 9, wherein a guiding groove is defined in the suction cover, around the opening of the suction cover, and said springs are positioned in said guiding groove.

* * * * *